J. H. TERRY.
AUTO TRAM CAR.
APPLICATION FILED JAN. 10, 1917.
1,259,166.
Patented Mar. 12, 1918.
2 SHEETS—SHEET 1.
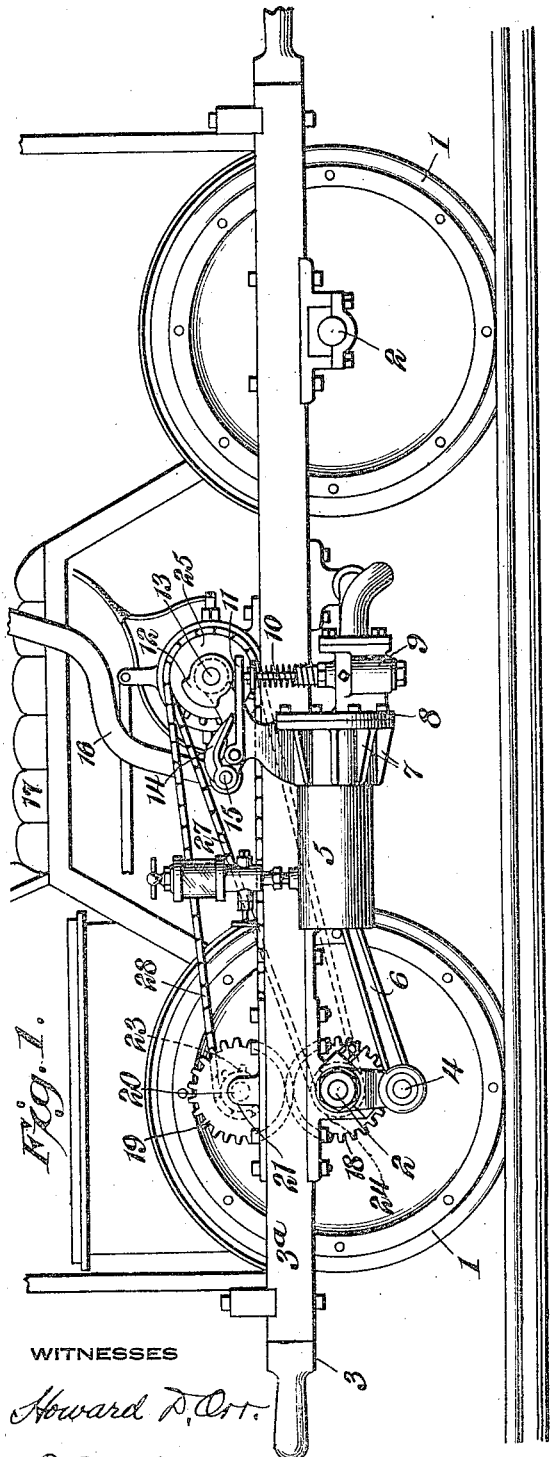
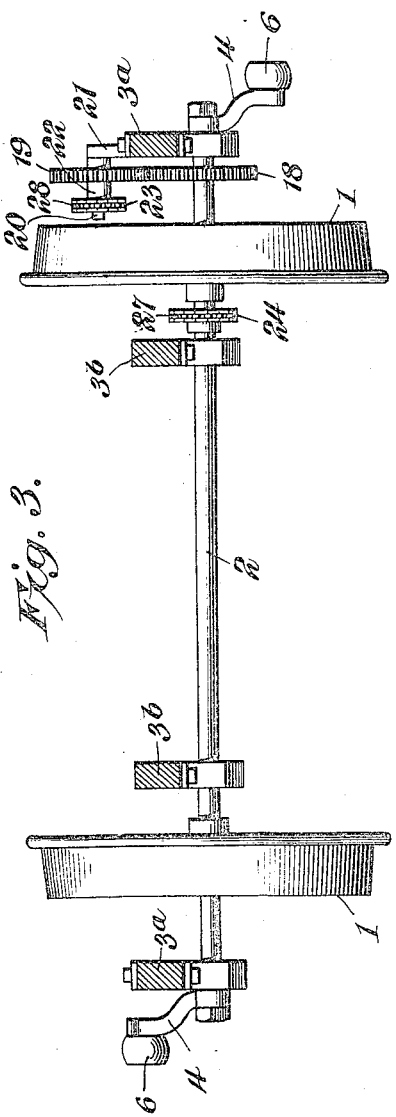
J. H. Terry, INVENTOR,
WITNESSES

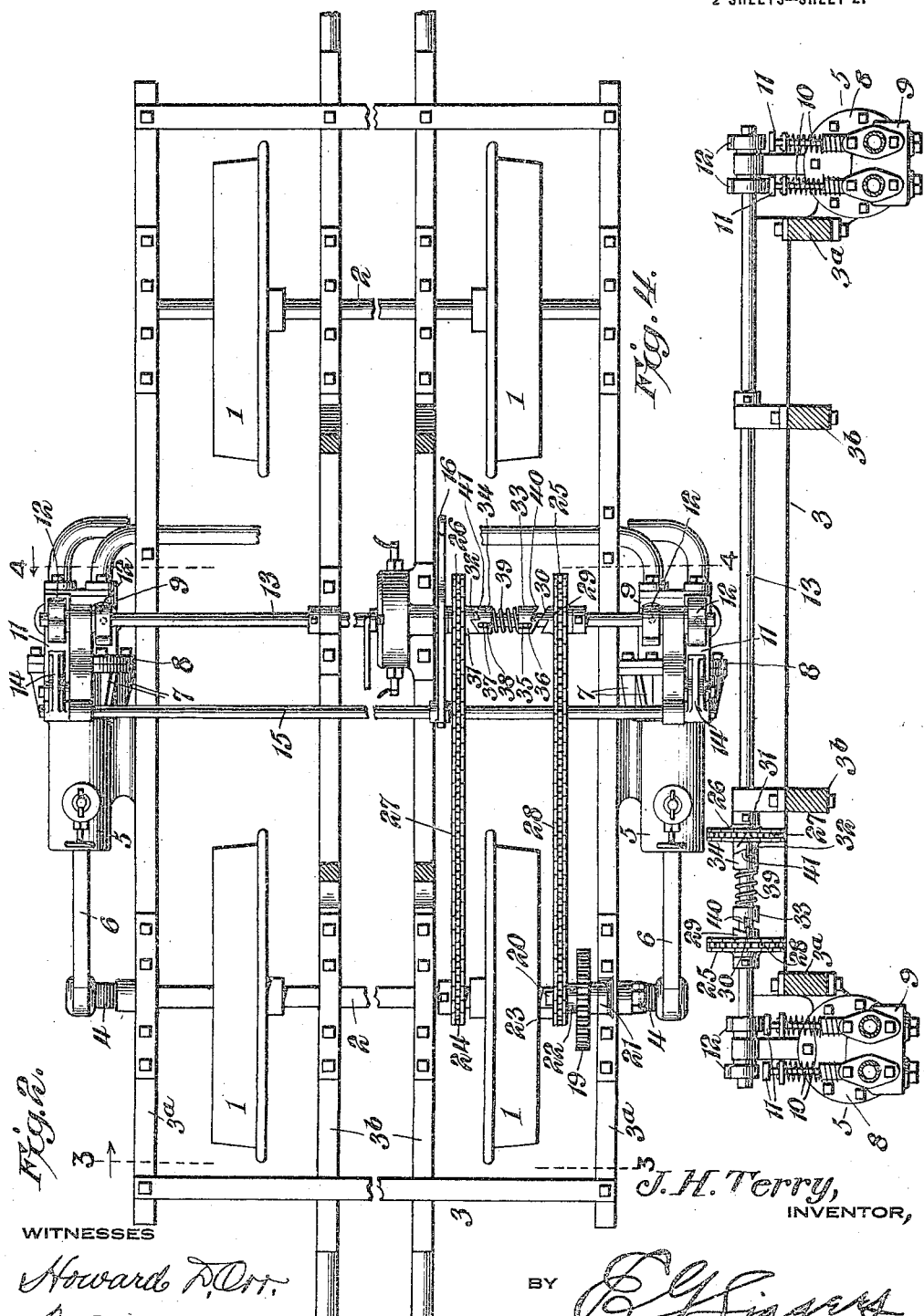

UNITED STATES PATENT OFFICE.

JOSEPH HUTCHINSON TERRY, OF GUABITO, PANAMA.

AUTO TRAM-CAR.

1,259,166.  Specification of Letters Patent.  Patented Mar. 12, 1918.

Application filed January 10, 1917. Serial No. 141,630.

*To all whom it may concern:*

Be it known that I, JOSEPH H. TERRY, a citizen of the United States, residing at Guabito, in the Republic of Panama, have invented a new and useful Auto Tram-Car, of which the following is a specification.

This invention has reference to auto tram-cars, that is, tram-cars provided with power units thereon, and its object is to provide an auto or self-propelled tram-car which may be readily reversed in the direction of movement.

There are auto tram-cars upon the market having explosion engines as the motive power, but these cars have the engines mounted high so that the center of gravity is correspondingly high, wherefore in narrow gage tracks the cars frequently overturn.

With the present invention the engine or engines are mounted at the sides of the car about on a level with the axles and are directly connected to an axle, while provision is made for the automatic shifting of the valve operating mechanism in accordance with the direction of travel of the car so that the valve mechanism will always act in the same sense irrespective of the direction of travel and thus permit the reversal of the explosion engine, the latter being of the four-cycle type, so that the car may be run in either direction indifferently.

The present invention comprises the mounting of the engines to provide a very low center of gravity for the car and at the same time permit the running of the car in either direction without any manual shifting of any parts.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a side elevation of a car embodying the invention.

Fig. 2 is a plan view of the structure with some parts in cross-section.

Fig. 3 is a section on the line 3—3 of Fig. 2, but omitting distant parts.

Fig. 4 is a section on the line 4—4 of Fig. 2, and also omitting distant parts.

In accordance with the invention the tram-car structure comprises wheels 1, axles 2 and a frame 3 to which the axles 2 are journaled, and which is carried by the axles. Such a structure may be similar to auto tram-car trucks on the market, except that the frame 3 is somewhat changed to accommodate certain parts. The truck is shown as a four wheel truck having one pair of wheels serving as driving wheels, wherefore one axle 2 has cranks 4 at opposite ends. The other pair of wheels serves simply as idlers.

At the sides of the truck and so located as to be substantially on a level with the axles are cylinders 5 constituting the cylinders of explosion engines of the four-cycle type. Such engines are usually provided in pairs, one engine on each side of the truck, and as the engines are alike but one will be described, for the description will be considered as applying to both. Each engine has a pitman 6 connected to a crank 4, and is provided at the head or closed end with cooling webs 7, so the engine is of the air-cooled type. There is also provided a cap plate 8 formed with valve casings 9 from which project valve stems 10 for the intake and exhaust valves of the engine, these parts being all of ordinary construction, and in the particular instance shown following the construction of the Fairbanks-Morse engine, wherefore no detailed description of the engine is needed. Each valve stem is controlled by a rocker 11 in the path of a cam 12 mounted on a cam shaft 13. One of the rockers 11 is in the path of a finger 14 on a shaft 15 controlled by a hand lever 16 carried into convenient relation to a seat 17 for a passenger, who may be the operator of the car. The shaft 15 extends across the car, so as to control both engines, but has only one hand lever 16 for its actuation, although hand levers may be provided on each side of the seat if such be desirable.

Mounted on the axle 2 to which the engines are connected is a gear wheel 18 meshing with another gear wheel 19 journaled on a stud shaft 20 fast to a bracket 21 secured to an appropriate one of the longitudinal beams of the truck frame, this beam in the particular showing of the drawings being an outside beam, that is, exterior to the wheels, and for convenience is designated in the drawings as the beam 3ª. The gear wheel 19 is provided with a hub 22 carrying a sprocket wheel 23 fast to it, so that the gear wheel and sprocket wheel turn together.

Mounted on the axle 2 to which the engines are connected is another sprocket wheel 24, which in the particular showing of the drawings is located between the corresponding driving car wheel 1 and another beam 3ᵇ forming part of the truck and located between the two drive wheels.

The cam shaft 13 has mounted on it two sprocket wheels 25, 26, respectively.

The sprocket wheel 26 is connected to the sprocket wheel 24 by a sprocket chain 27. The sprocket wheel 25 is connected to the sprocket wheel 23 by a sprocket chain 28.

The sprocket wheel 25 is formed with a hub 29 having ratchet teeth 30 thereon. The sprocket wheel 26 is formed with a hub 31 having ratchet teeth 32 thereon. The sprocket wheels 25 and 26 with their toothed hubs, which face each other, are spaced apart an appropriate distance, and between them there are mounted collars 33, 34, respectively. The collar 33 has a longitudinal recess 35 therein traversed by a pin 36 projecting radially from the cam shaft 13. The collar 34 is provided with a similar slot 37 traversed by a pin 38 extending radially from the shaft 13. The two collars 33 and 34 are separated by a spring 39 surrounding the shaft 13 between them. The teeth 30 and 32 are oppositely disposed and the collars 33 and 34 have similar teeth 40 and 41 arranged to engage the first-named teeth. The disposition of the teeth is such that when the two collars 33 and 34 are rotating in the same direction the teeth of one collar will engage the teeth of the adjacent hub and the teeth of the other collar will ride idly past the teeth of the other hub.

If, now, it be assumed that the car is traveling in a certain direction, say, toward the left, as shown in Fig. 2, the axle 2 upon which the driving wheels of the tram-car are mounted will be rotating counterclockwise. The sprocket wheel 24 rotates with the axle 2 in the same direction, but the sprocket wheel 23 because of the interposition of the intermeshing gears 18 and 19 is driven by the axle in the opposite direction. Motion is transmitted simultaneously from the two sprocket wheels 23 and 24 by way of the chains 28 and 27 to the sprocket wheels 26 and 25, respectively, so that the sprocket wheels 25 and 26 rotate in opposite directions in accordance with the direction of rotation of the sprocket wheels driving them through the sprocket chains. The result is that the teeth on the hub of one sprocket wheel, say, the sprocket wheel 25, ride idly over the teeth of the adjacent collar 33 because the particular sprocket wheel 25 is rotating clockwise. The other sprocket wheel 28 is at the same time rotating counterclockwise because its direction of rotation is the same as that of the driving axle 2. The teeth 32 of the hub 31 engage the teeth 40 of the collar 34, being held thereto by the spring 39 which transmits motion to the collar 34 to move it into engagement with the hub 31 by the action of the teeth of the hub 29 upon the teeth of the collar 33. The spring 39 may be only under sufficient tension to prevent looseness of the collars and insure the movement of one collar into engagement with the hub by the action of the other hub upon the other collar. The engaged collar rotates the shaft 13 through the respective pin traversing the slot in the collar.

It may be assumed that the shaft 13 is rotating counterclockwise, and this produces the proper sequence of action in the valves of the engines. Suppose, now, that the direction of rotation of the driving wheels 1 and axle 2 be reversed. The direction of rotation of the sprocket wheels 25 and 26 is reversed, so that the sprocket wheel 26 is disconnected from the adjacent collar 34 while the collar 33 is moved into engagement with the sprocket wheel 25. Now, however, the reversal of movement of the vehicle causes a corresponding reversal in the rotation of the sprocket wheel 23, wherefore the sprocket wheel 25 rotates in the same direction as the sprocket wheel 26 did previously to the reversal of travel of the tram-car. The result is that the cam shaft 13 rotates in the same direction as at first, which may be considered as counterclockwise, and the valves move in the same sequence as before, so that the car may be reversed in the direction of travel without affecting the cycle of operations of the engines.

The shifting of the ratchet collars, whereby the cam shaft is caused to rotate in the same direction irrespective of the direction of travel of the car, is brought about wholly automatically, and needs no attention on the part of the operator of the vehicle.

With the invention applied and thus insuring the actuation of the engine valves in proper sequence irrespective of the direction of movement of the vehicle, the latter may be caused to travel in either direction at will and without the necessity of manipulating any complicated parts.

The location of the engine cylinders and parts associated therewith close to the rails and the direct actuation of the driving axle by the engines result in a material lowering of the center of gravity of the vehicle, wherefore the vehicle is materially stabilized and may be driven at a relatively high speed and will readily take curves without liability of upsetting. This is of advantage in making the tram-car reliable under circumstances which have heretofore caused the condemnation of the tram-car on account of its cranky tendencies.

What is claimed is:—

1. A tram-car provided with explosion engine driving means having the engine cylinders and parts associated therewith located on substantially the level of the axles of the car, and means for automatically maintaining the direction of rotation of the valve operating parts of the engines irrespective of the direction of travel of the car.

2. A tram-car provided with explosion engine driving means, and valve-operating means having automatic means responsive to reversals in the direction of travel of the car for maintaining the order of movement of the valve-operating mechanism irrespective of the direction of travel of the car.

3. A tram-car having explosion engine power means thereon directly connected to an axle of the tram-car and located on substantially the same level as the axle, means for operating the valves of the engine, and means for automatically changing the direction of drive from the axle of the car to the valve-operating mechanism to cause the valves to operate in the same sense irrespective of the direction of travel of the car.

4. A tram-car having explosion engine driving means provided with intake and exhaust valves, actuating means for the valves, and automatically reversing connections between the drive axle of the car and the valve-operating means to cause the valves to operate in the same sense irrespective of the direction of travel of the car.

5. A tram-car provided with an explosion engine driving means for the car with the explosion engine provided with intake and exhaust valves, and said engine being directly connected to an axle of the car for driving said car, a cam shaft, and cams for operating the valves, separate driving members for the cam shaft mounted to turn thereon, separate connections between the driving member and the drive axle, one of the connections including motion-reversing devices, and automatically shiftable means associated with the members mounted on the cam shaft for coupling one or the other of said members at a time to the cam shaft for the actuation of the latter.

6. In a tram-car provided with a drive axle, an explosion engine for actuating the drive axle, valve means on the engine, a rotatable shaft, and means thereon for controlling the valve means on the engine, clutch members on the shaft and mounted to turn independently thereof, other clutch members on the shaft between the first-named clutch members and movable longitudinally of the shaft into engagement with either of the other clutch members, connections between the first-named clutch members on the shaft and the car axle for rotating said members simultaneously in opposite directions, means for connecting the second-named clutch members to the shaft and permitting said clutch members to move lengthwise of the shaft, and means whereby one clutch member is yieldably connected to the other for causing the shifting of both clutch members by forces applied to one clutch member.

7. In a tram-car, an explosion engine connected to an axle of the car for driving the latter, and said engine having valve means thereon, a shaft and members thereon for actuating the valve means, rotatable members mounted loosely on the cam shaft in spaced relation one to the other and each provided with a clutch member facing the clutch part of the other rotatable member, clutch sleeves mounted on the shaft and connected thereto for movement lengthwise of the shaft, a spring on the shaft interposed between the movable clutch members, and said second-named clutch members having a range of movement to cause the engagement of the shaft with one of the rotatable members and its disconnection from the other rotatable member, and connections between the car axle and the two rotatable members, one of the connections including motion reversing means.

8. A tram-car provided with a driving axle having cranks thereon, an explosion engine connected directly to the crank and located at a low point on the car, said engine being provided with valves, a cam shaft for operating the valves, sprocket wheels loosely mounted on the cam shaft in spaced relation one to the other, sprocket wheels connected to the axle with one sprocket wheel connected to the axle through motion-reversing mechanism, sprocket chains connecting the sprocket wheels of the cam shaft to those connected with the axle, two-part clutches on the cam shaft each having one part fast to a respective sprocket wheel and the other parts slidable on the shaft, connections between the slidable part of each clutch and the cam shaft permitting the sliding movement of the clutch member and constraining the clutch member to rotate with the shaft, and a spring interposed between the two slidable members, whereby one clutch is moved into clutching engagement and the other is moved out of clutching engagement simultaneously with the movement of the first one and in accordance with the direction of travel of the car.

In testimony that I claim the foregoing as my own, I have hereto affixed my signature in the presence of two witnesses.

JOSEPH HUTCHINSON TERRY.

Witnesses:
J. M. McMILL,
J. M. KYES.

Copies of this patent may be obtained for five cents each, by addressing the "Commissioner of Patents, Washington, D. C."